United States Patent [19]
Ryckman et al.

[11] 3,885,424
[45] May 27, 1975

[54] TENSILE TEST SPECIMEN HOLDER

[75] Inventors: George E. Ryckman, East Liverpool, Ohio; Walter J. Budd, Waterbury, Conn.

[73] Assignee: Uniroyal, Inc., New York, N.Y.

[22] Filed: Jan. 21, 1974

[21] Appl. No.: 435,023

Related U.S. Application Data

[62] Division of Ser. No. 213,265, Dec. 29, 1971, Pat. No. 3,803,907.

[52] U.S. Cl. ............................................. 73/103
[51] Int. Cl. ........................................... G01n 3/04
[58] Field of Search ...... 73/103; 198/131; 211/60 R, 211/121, 126; 269/40

[56]         References Cited
         UNITED STATES PATENTS

| | | | |
|---|---|---|---|
| 316,172 | 4/1885 | Potts | 198/131 |
| 3,117,443 | 1/1964 | McClelland et al. | 73/103 |

*Primary Examiner*—Jerry W. Myracle
*Attorney, Agent, or Firm*—Norbert P. Holler

[57] ABSTRACT

A tensile testing apparatus includes an intermittently driven conveyor containing cradles of predetermined positioning shoulder configuration at one end shaped to receive a sample to be tested and to orient the sample transversely to the conveyor feed direction. The conveyor includes a straight line portion for arranging the samples in order before the testing apparatus with their identity tags visible. The sample is passed through apparatus for applying two bench mark stripes in predetermined spaced orientation and subsequently into a position for alignment with the probe of a thickness gauge and thereafter into alignment with a pair of clamping jaws of a tensile stressing device which engage opposite ends of the sample in directions transverse to the conveyor feeding direction. The bench mark stripers apply a pair of side-by-side contrasting bench marks (white and black stripes) in an arrangement for photoscanning irrespective of the color of the material being tested. The clamping jaw mechanism includes means for the controlled outward movement of one of the clamping jaws along with the movement of two photoscanners which are oriented to track the respective bench marks. The stress and strain conditions sensed by the photoscanners and the movable jaws are transmitted to recording means such as a computer along with the measurement of the thickness. The mechanism includes means for removing the tested material from the clamping jaws such as by an air blast and for returning the clamping jaws to an original position along with the resetting of the photoscanners to put the parts in a condition for operation on the next sample moved forward by the conveyors.

2 Claims, 28 Drawing Figures

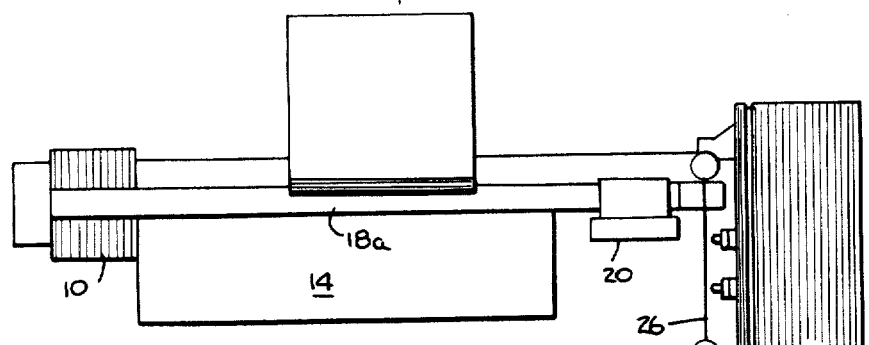
Fig. 1.
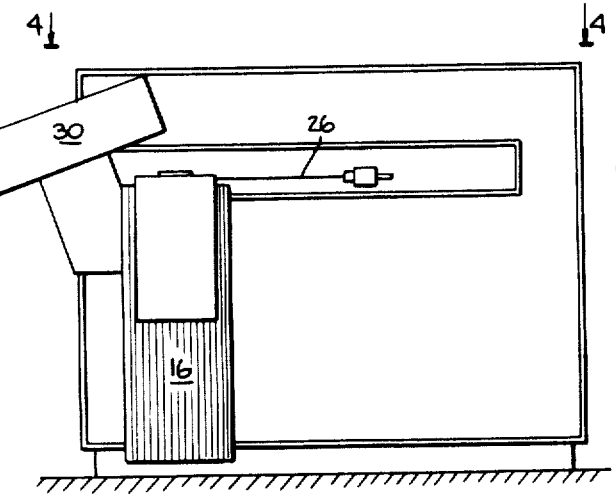
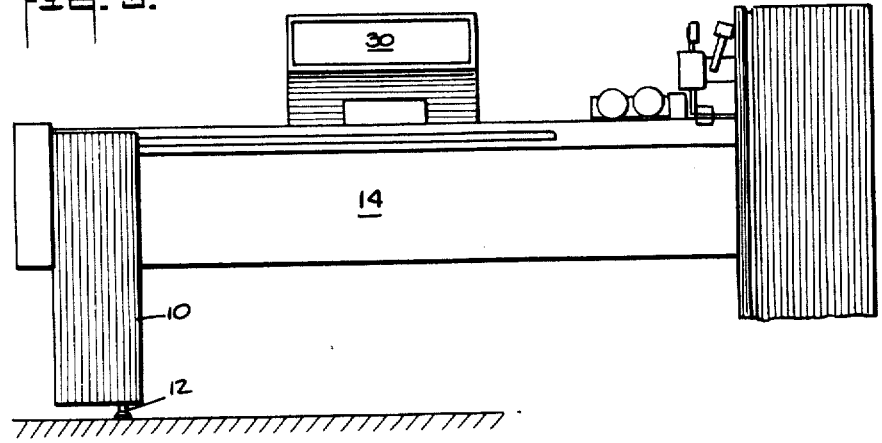
Fig. 3.
Fig. 2.

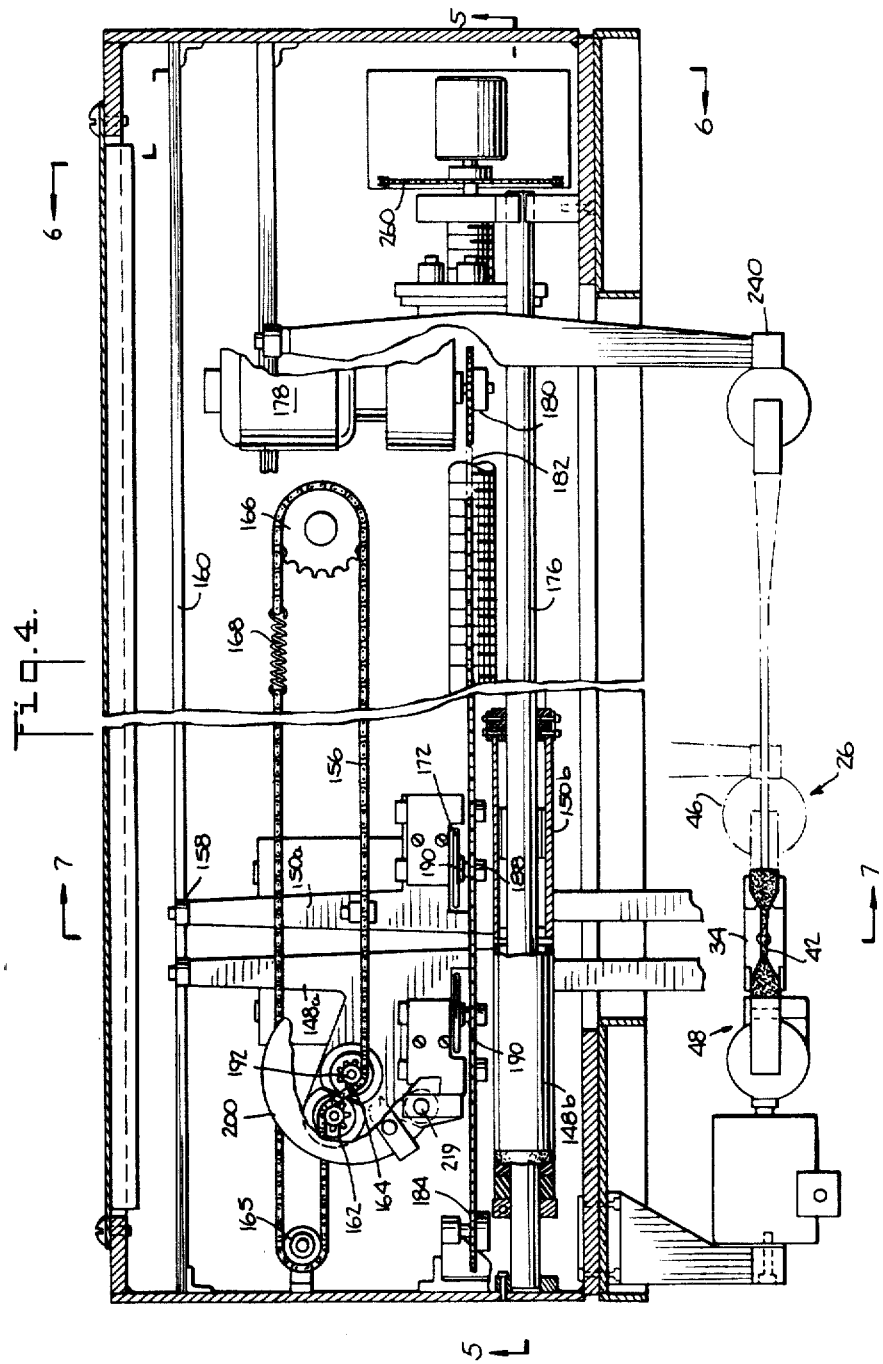

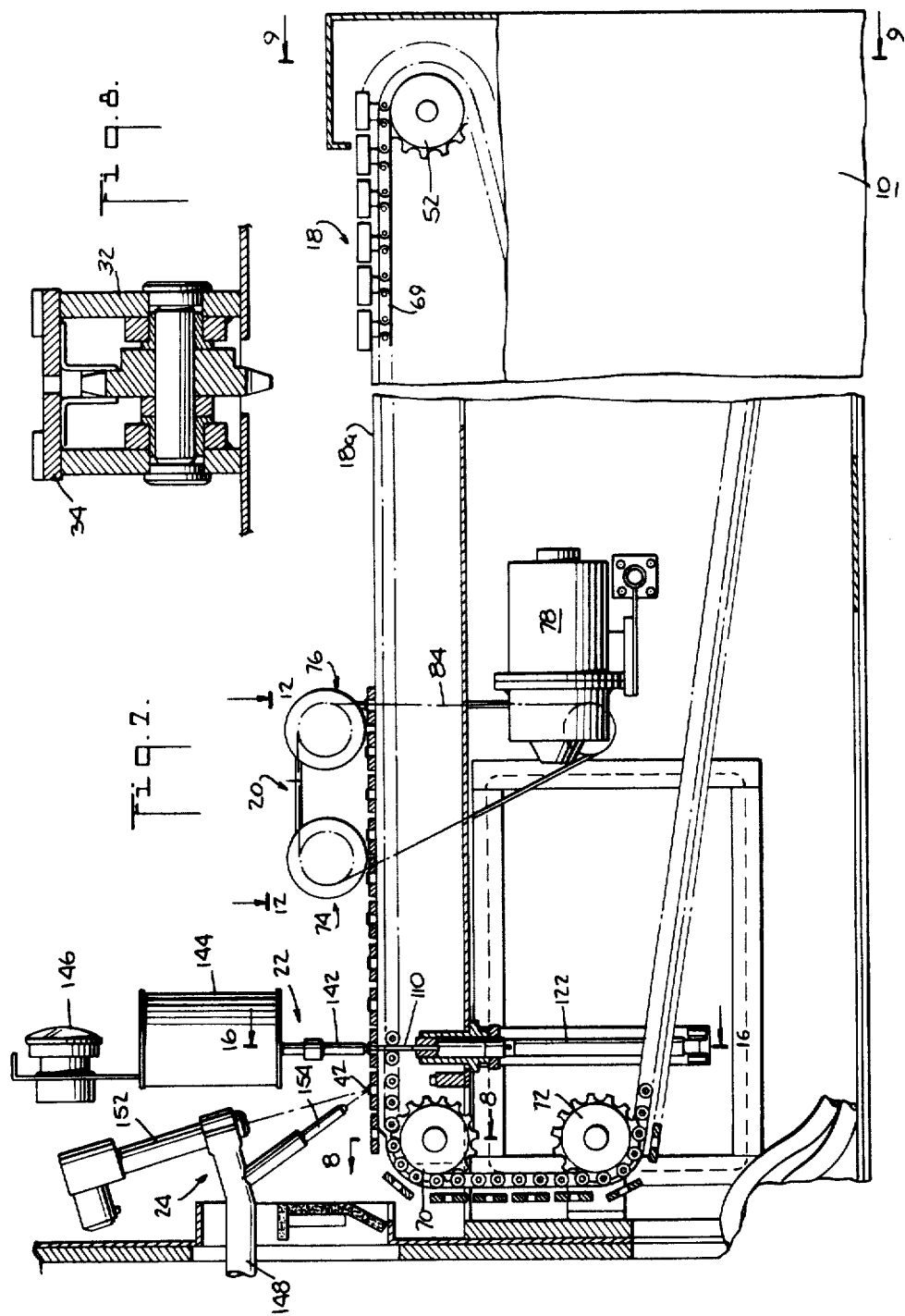

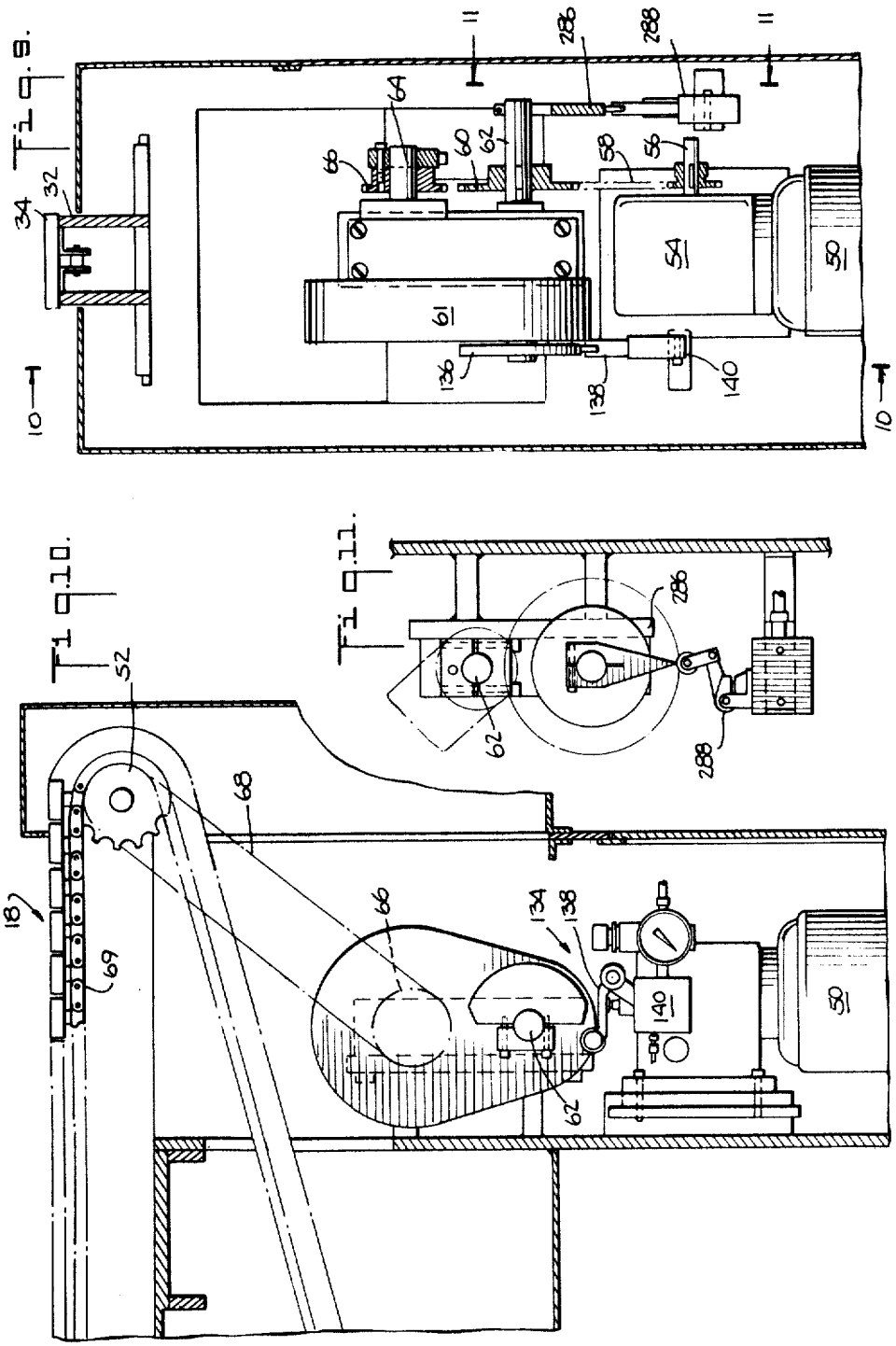

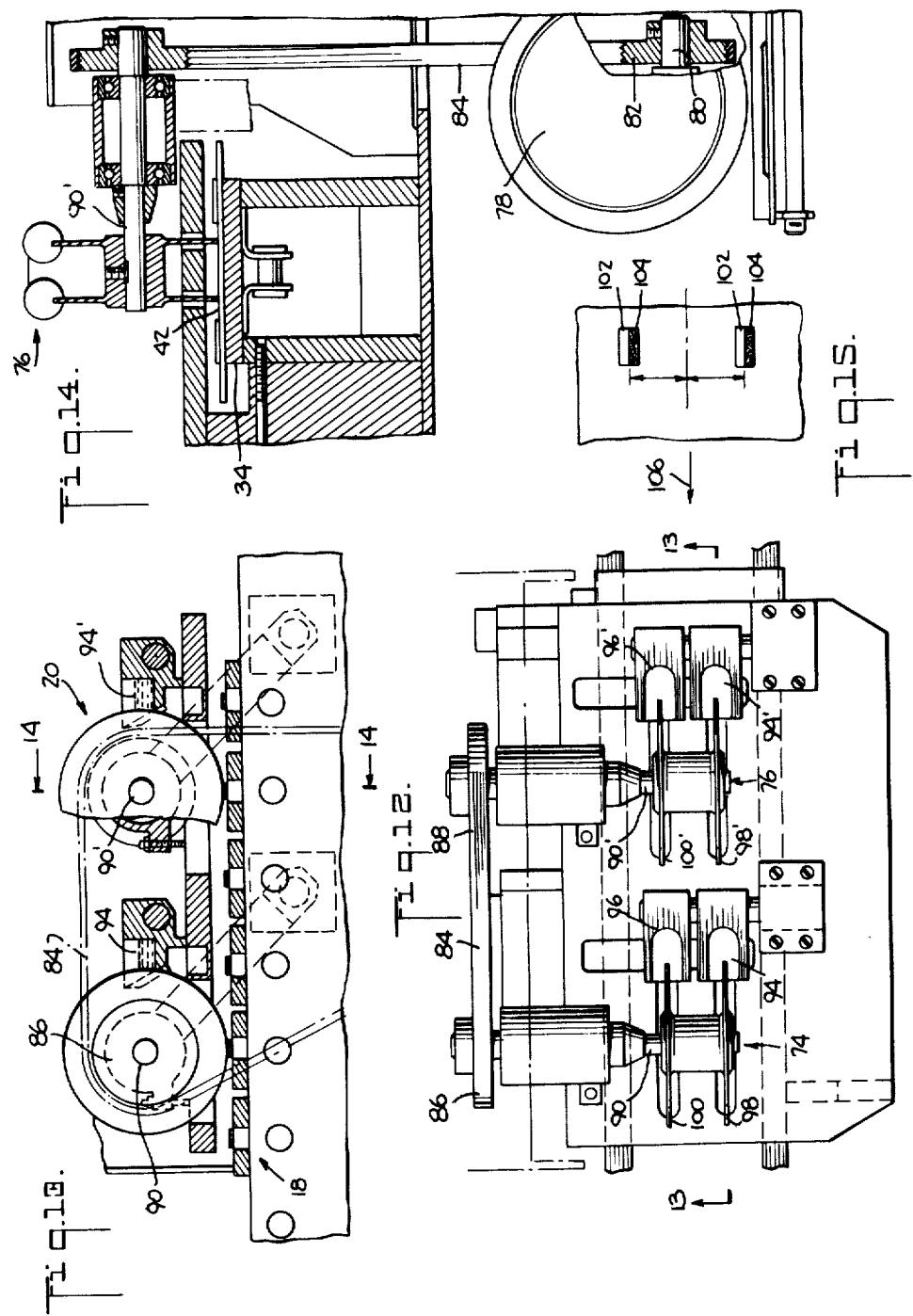

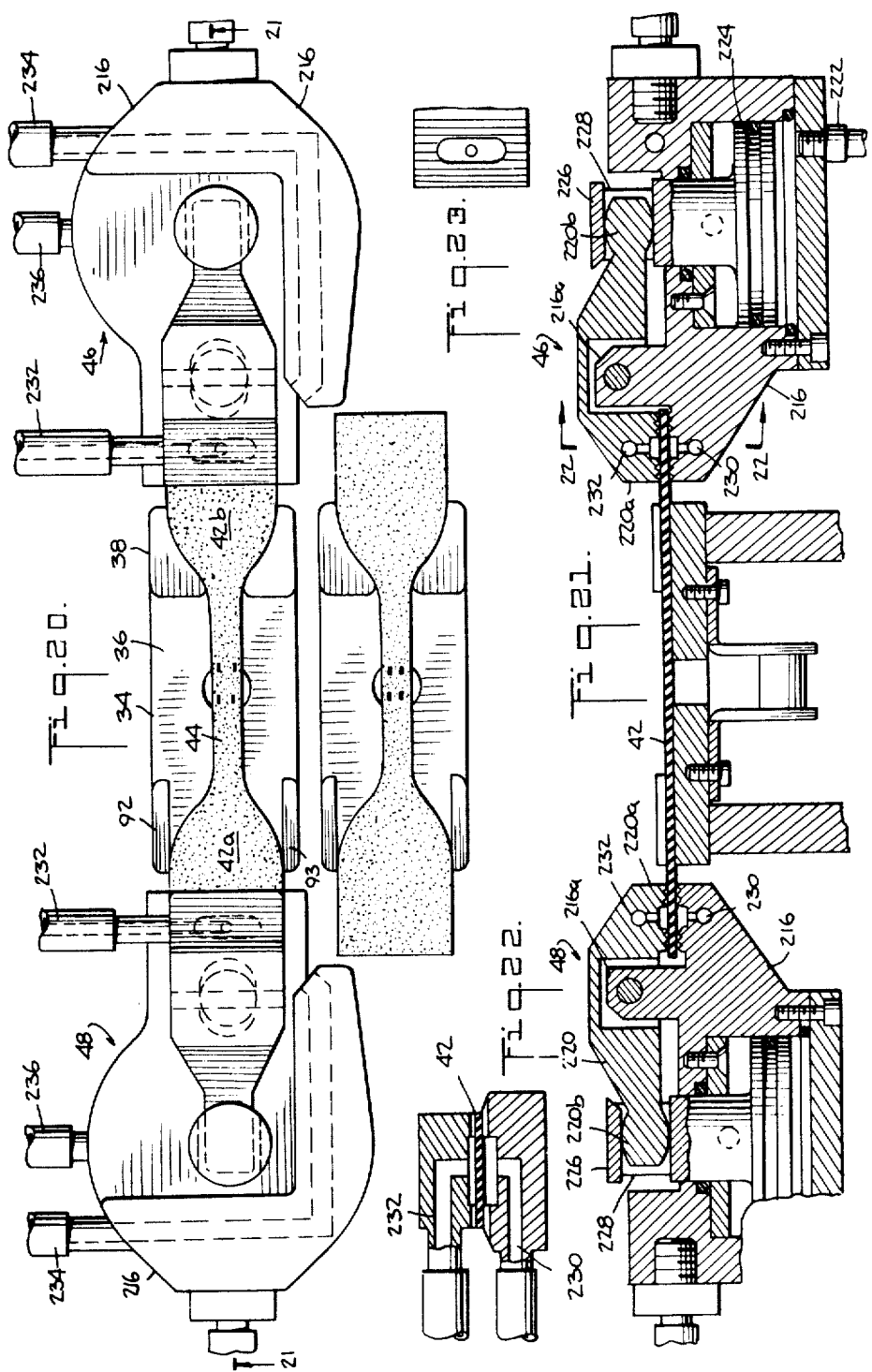

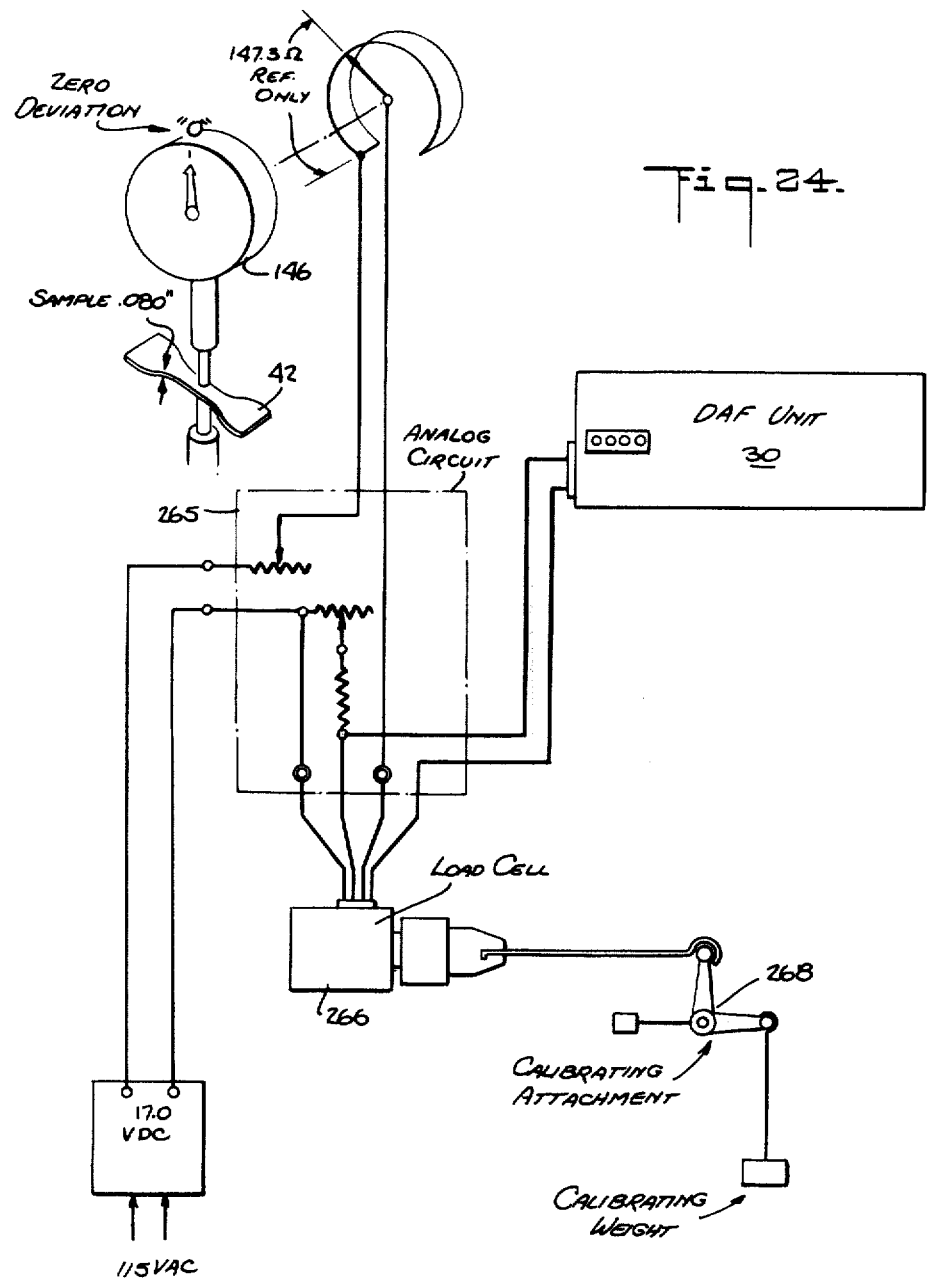

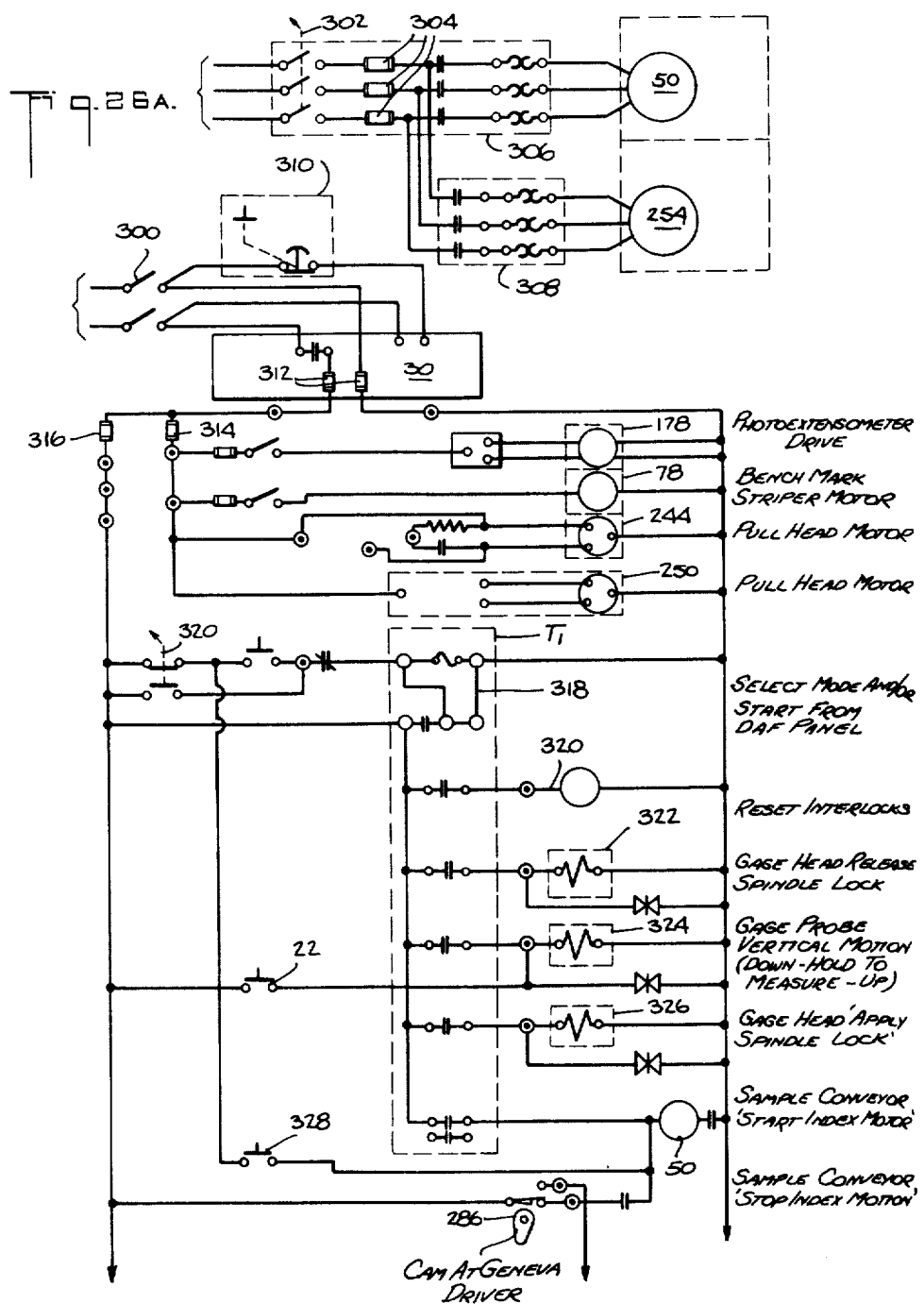

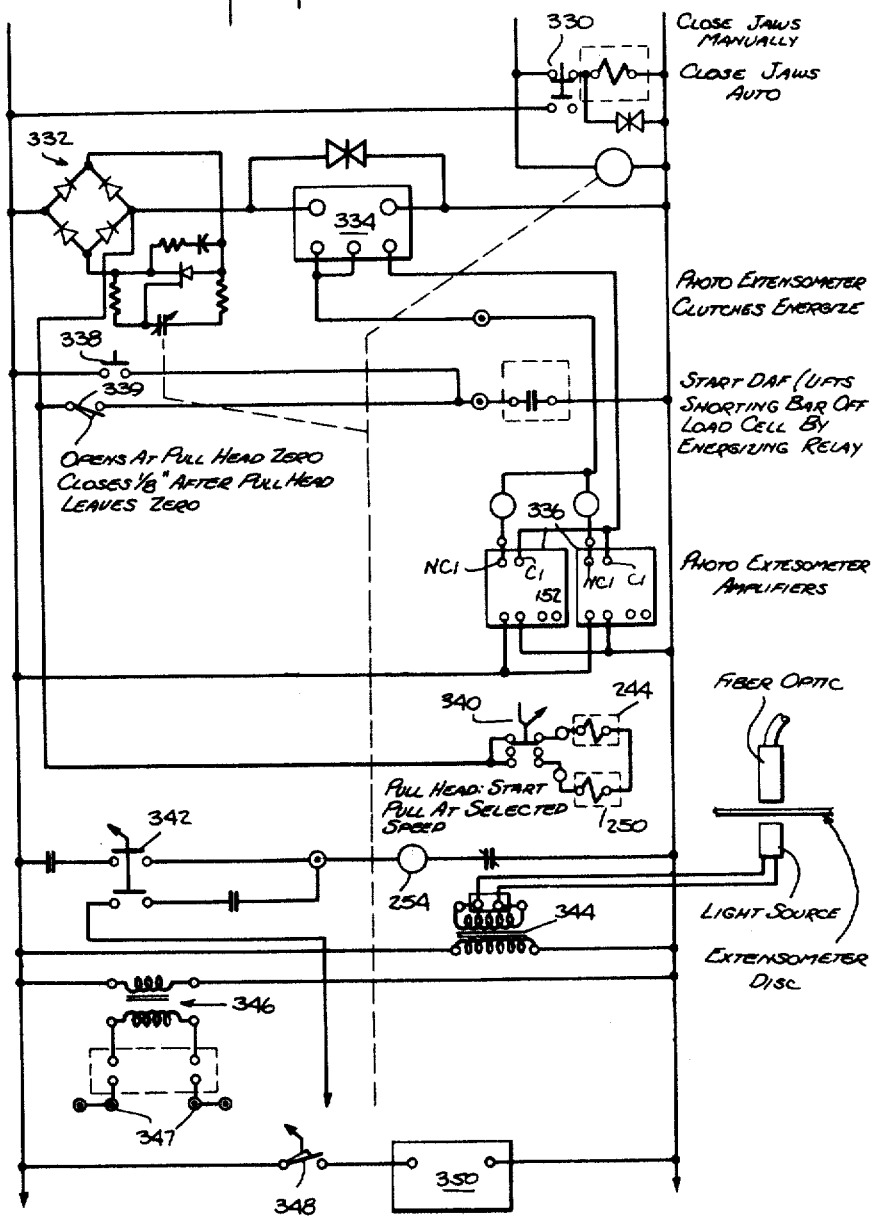

ём
3,885,424

TENSILE TEST SPECIMEN HOLDER

This is a division of application Ser. No. 213,265, filed Dec. 29, 1971, now U.S. Pat. No. 3,803,907.

BACKGROUND OF THE INVENTION

1. Field of the Invention

This invention relates in general to the construction of tensile testing apparatus, to a method of continuously testing a series of samples and, in particular, to a new and useful apparatus particularly for testing materials having a high degree of stretch, such as rubber; and which includes means for orienting the samples to be tested in a row on a conveyor which is moved successively into association with means for applying bench marks to the sample, for testing the sample for thickness and for positioning the sample into association with clamping jaws for effecting the tensile testing while the bench marks are continuously observed by movable scanners.

2. Description of the Prior Art

At the present time, tensile testing machines are known, which are capable of testing materials displaying a large amount of stretch, such as cured rubber. Devices of this nature include improved automatic apparatus for tensile testing but they have the disadvantage that they have either no means or insufficient means for continuously handling a plurality of samples and for presenting them one after the other to a series of testing or preparation stations.

SUMMARY OF THE INVENTION

The present invention is an improvement over the prior art particularly in respect to an improved tensile testing machine having a supporting cradle for the materials to be tested which hold the samples in a particular orientation so that they can be advanced rapidly through the preparation and testing stages without difficulty and also to a method of testing a series of samples. The testing equipment of the invention advantageously includes a continuously operable conveyor with attached individual cradles, shaped to orient the specimens in a particular manner such that neck portions of the samples extend transversely between the clamping jaws and widened portions are in a position for easy engagement by the clamping jaws of the testing equipment. For this purpose, the cradles include a shoulder configuration providing a means for accurately centering and positioning each sample. The conveyor includes a horizontal portion so that the samples to be tested may be arranged in a row in visible view with their marking indications always discernible prior to their actual testing.

In a preferred form of the invention, the individual samples to be tested are arranged in the various cradles defined on an endless chain conveyor, and they are advanced along a horizontal path first into association with an apparatus for automatically applying two bench mark stripes thereon which include contrasting areas providing demarcation lines for the subsequent photoscanning of each. The conveyor is then moved intermittently to advance the specimens to be tested first into association with a thickness gauge which has a novel rise and fall bottom anvil which moves upwardly through a defined opening of the carrying cradles when a cradle is aligned therewith. It cooperates with an oppositely arranged gauge member to provide desired thickness testing information.

The conveyor is constructed to move between tensile gripping members arranged on respective sides thereof and to position the sample to be tested precisely for engagement by the automatic operation of the testing jaws. One of the jaws is arranged to engage the testing material and to move outwardly during the testing procedure, and a scanner transport mechanism is provided to effect a timed corresponding movement of photoscanners associated with each bench mark. The information obtained from the jaw movement and the applied tensile force on the specimen as well as the information obtained from photoscanner movement is immediately transmitted to a computer which has previously received information from the thickness gauge. The apparatus also includes means for discharging each sample from the jaws, after the testing is finished, and for returning and resetting the photoscanners and jaws automatically.

Accordingly, it is an object of the invention to provide a device for positioning samples for tensile testing which includes a cradle having a shoulder formation for accurately orienting the sample such that wider end portions can be easily gripped by gripping jaws of a tensile testing apparatus.

A further object of the invention is to provide a conveyor system for automatically applying bench marks in accurate positions in samples to be tested by tensile testing equipment.

A further object is to provide a method tensile testing a series of samples comprising moving a series of articles together through a visible feed path to present each one in succession first into a marking station, applying two spaced bench marks to the samples at the marking station, and feeding each sample in succession to a tensile station and subjecting the sample to tension while the position of the bench marks are recorded.

A further object of the invention is to provide a conveyor for displaying a plurality of samples to be tested in a row for subsequent intermittent movement into association first with bench mark applying means, and then into association with means for obtaining a thickness value of the sample and for subsequent movement into association with clamping elements for tensile testing while the bench marks are scanned by photoscanners.

A further object of the invention is to provide a tensile testing apparatus which includes means for accurately positioning samples to be tested automatically into association with clamping jaws of a tensile tester and for moving photocell scanners in a manner to correspond to the location of two spaced bench marks applied to the testing samples and to improved apparatus for releasing the sample after testing and for returning and resetting the photoscanners.

A further object of the invention is to provide a device for testing specimens for tensile characteristics which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

FIG. 1 is a partial top plan view of a device for automatically conveying samples into association with thickness measuring means, bench marking devices, tensile gripping elements and photoelectric scanners for the purpose of conducting tensile tests and for recording the sensed information, as constructed in accordance with the invention;

FIG. 2 is an end elevational view of the device shown in FIG. 1;

FIG. 3 is a side elevational view;

FIG. 4 is a section taken along the line 4—4 of FIG. 2;

FIG. 5 is a section taken along the line 5—5 of FIG. 4;

FIG. 7 is a section taken along the line 7—7 of FIG. 4;

FIG. 8 is a section taken along the line 8—8 of FIG. 7;

FIG. 10 is a section taken along the line 10—10 of FIG. 9;

FIG. 11 is a section taken along the line 11—11 of FIG. 9;

FIG. 12 is an enlarged plan view of the bench marking device;

FIG. 13 is a section taken along the line 13—13 of FIG. 12;

FIG. 14 is a section taken along the line 14—14 of FIG. 13;

FIG. 15 is a partial plan view indicating the bench markings provided for the guidance of the photocells;

FIG. 20 is a partial enlarged top plan view of the cradle holder and clamping jaws for the sample being tested;

FIG. 21 is a section taken along the line 21—21 of FIG. 20;

FIG. 22 is a section taken along the line 22—22 of FIG. 21;

FIG. 23 is a partial bottom view of a clamping jaw shown in FIG. 20;

FIG. 24 is a perspective schematic view of the thickness measuring device;

GENERAL DESCRIPTION OF THE PREFERRED EMBODIMENT

Figure 9:
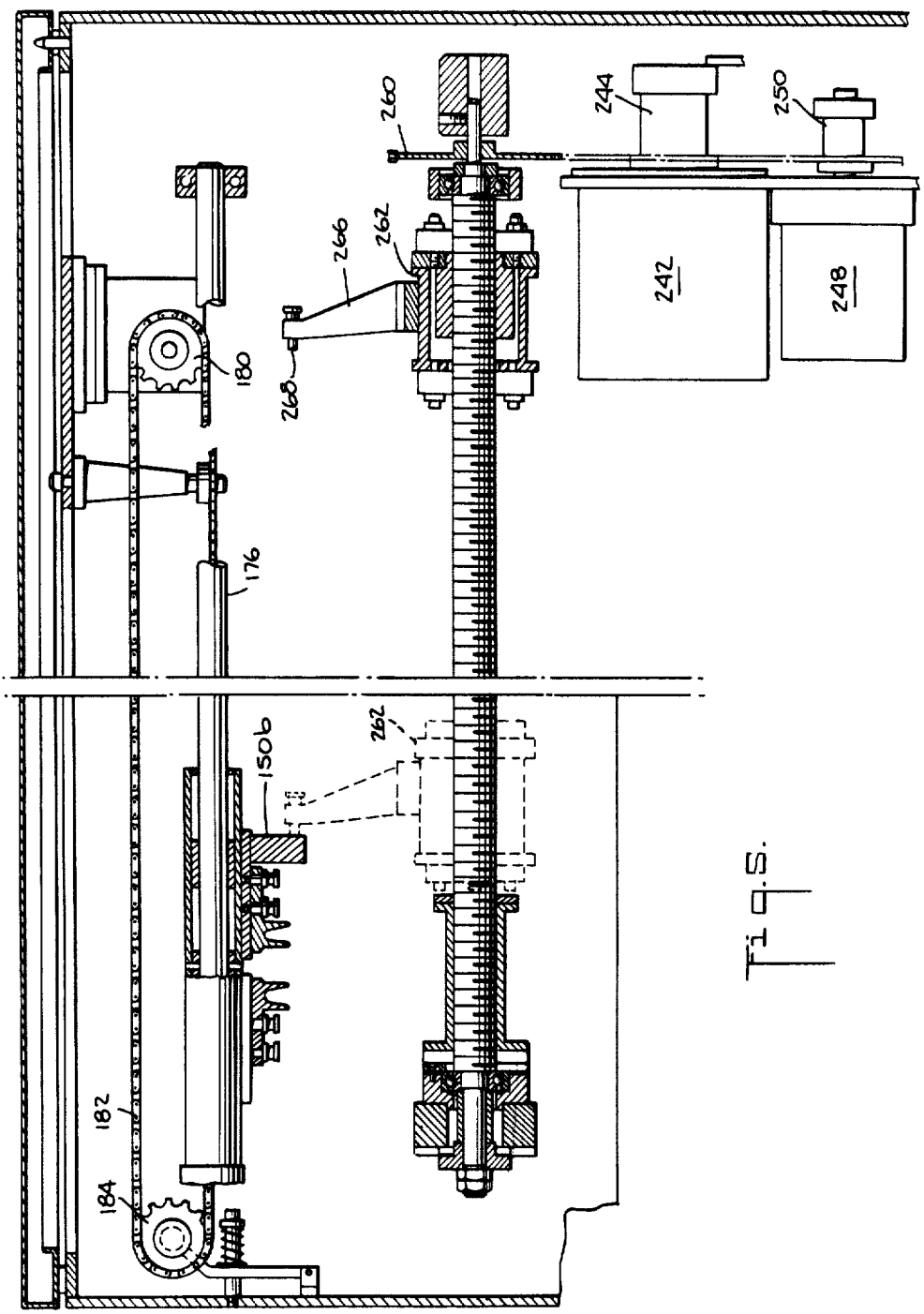
FIG. 9 is a section taken along the line 9—9 of FIG. 7.

Referring to the drawing in particular, the invention embodied therein comprises a first housing part 10 at one end having a supporting pedestal 12, an intermediate housing part 14 and a tensile testing section housing part 16. As shown in FIGS. 1 to 3, 7 and 10, the apparatus includes conveyor means, generally designated 18, which is movable from the first end 10 successively into association with bench marking means, generally designated 20, thickness measuring and recording means, generally designated 22, photocell scanning means, generally designated 24, and a tensile gripping mechanism, generally designated 26 (See also FIGS. 20 to 22). The apparatus also includes an information card punch machine, generally designated 28, and a computer or data acquisition and formatting unit, generally designated 30. The card punching unit 28 and the computer 30 are connected electrically for receiving information in respect to the thickness measurement unit 22, the gripping mechanism 26 and the photoelectric scanning means 24.

In accordance with a feature of the invention, the conveyor means 18 comprises an endless chain conveyor with conveyor links 32, as best seen in FIG. 8, which carry or are formed as part of individual conveyor support members or sample cradles, gnerally designated 34. The cradles 34 have a flat top 36, as shown in FIG. 20, with shoulders 38 and 40 at one end, and 92 and 93 at the other end, which define a shoulder engaging portion for a sample 42 so that a neck portion 44 is held transversely to oppositely arranged movable and fixed clamping jaw members 46 and 48, respectively. The sample 42 includes end portions 42a and 42b which are widened and are arranged in the cradle by the configuration of the cradle such that they are oriented by easy engagement by the clamping jaws 46 and 48.

As shown particularly in FIGS. 9, 10 and 11, the drive for the conveyor means 18 includes a drive motor 50 which provides intermittent rotative movement to a conveyor sprocket 52 (FIG. 10). For this purpose, the motor 50 drives through a speed reducer 54 to an output shaft 56, which in turn drives through a chain 58 and a sprocket 60 to an input shaft 62 of an intermittent drive mechanism contained in a housing 61, to produce an intermittent drive motion to an output shaft 64 which drives the input sprocket 52 through a sprocket 66 and a chain 68. The conveyor means 18 includes an endless chain 69, which, as indicated in FIGS. 10 and 7, is guided over sprockets 70 and 72 and over a sprocket (not visible) back to the sprocket 52. The conveyor includes an upper reach 18a, which travels from the front housing part 10 in a horizontal path down to the tensile testing housing part 16. The conveyor chain 69 is made up of link elements with the sample cradles 34, as shown in FIGS. 20 to 22.

The samples or specimens to be tested 42 are placed in position on each successive cradle link 34, and they are moved intermittently into association first with the bench marking mechanism 20. The bench marking mechanism 20 is shown in particular in FIGS. 12 to 15, and it comprises two sets of spaced striping wheel sets, generally designated 74 and 76, which are driven from a common motor 78 (FIG. 14). The motor 78 includes a shaft 80 having a drive pulley 82 driving a belt 84 and pulleys 86 and 88 on bench marker shafts 90 and 90', respectively.

Each bench mark striping wheel set 74 and 76 is mounted to overlie the cradle 34 in the location between the shoulders 38 and 40 at one end and shoulder elements 92 and 93 at the opposite end, and they are rotated at substantially the same speed and same direction as the movement of the conveyor means 18. The sets 74 and 76 are adjustable above the samples which ride in the cradles 34, and they are continuously driven by the motor 78. The wheel sets are located between the spaced sample pieces whenever the conveyor is at rest.

The bench marking unit, generally designated 20, includes ink fountains 94' and 96' associated with each wheel of each set. The set 74 includes a wheel 98 and a wheel 100, which are offset in a lateral direction in respect to the conveyor feed from corresponding wheels 98' and 100' of the set 76. The fountains 94 and 96 of the striper wheels of the first set 74 contain black paint, while the second fountain set (94' and 96') of stripper wheels 98' and 100' of the set 76 contain white paint. The two striper wheel sets 74 and 76 combine to provide side-by-side black and white lines, and the bench marks are the separation line between the black and white lines. FIG. 15 shows a sample of the white bench marks 102 and the black laterally adjacent marks 104 with the direction of feed being indicated by arrow 106.

In some instances, after the bench marks are applied, it is desired to move the conveyor along a path bringing it into association with photoelectric cell scanners (not shown) for the purpose of checking the positioning of the bench marks. However, in the present instance, the apparatus is shown in an arrangement in which, after the conveyor 18 has moved the sample through the bench marking apparatus 20, then moves the sample into association with the thickness measuring means, generally designated 22.

Figure 16:
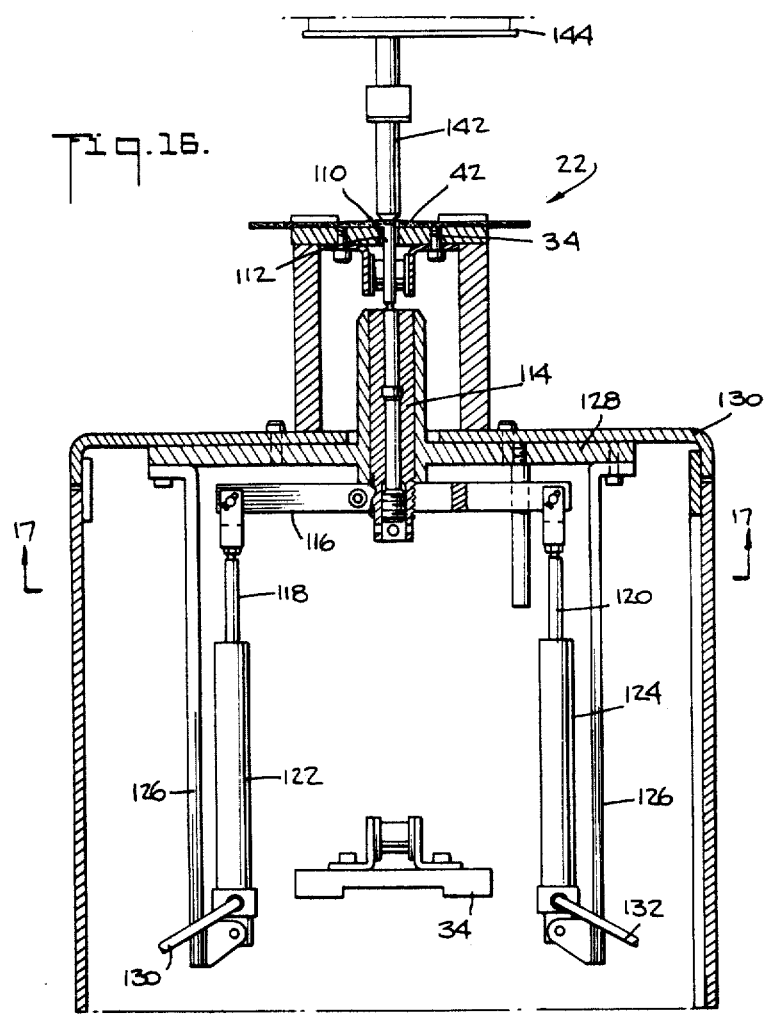
FIG. 16 is a section taken along the line 16—16 of FIG. 7.
Figure 17:
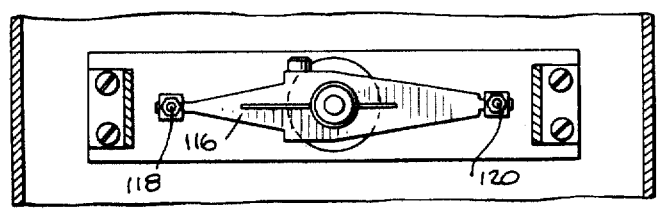
FIG. 17 is a section taken along the line 17—17 of FIG. 16.

The thickness measuring means 22, as shown in connection with FIGS. 7, 16 and 17, includes an anvil portion 110 which projects through an opening 112 of the cradle 34 to engage the underside of the sample 42 when the cradle 34 is oriented in a thickness testing position. The anvil 110 is slidable in a guide 114, which is affixed to a so-called whiffle tree or crossbar 116 having respective outer ends connected to piston rod members 118 and 120, respectively, of air cylinders 122 and 124. The air cylinders 122 and 124 are carried on bracket members 126, which are secured to a support plate 128, which is affixed to the underside of a conveyor frame 130. Air pressure lines 130 and 132 for actuating each piston rod 118 and 120 to lift the anvil 110 upwardly for testing purposes are controlled by a cam control mechanism, generally designated 134, as shown in FIG. 10, which includes a cam 136 carried on the shaft 62, and which actuates a lever member 138 to actuate a valve 140 for supplying air pressure to the cylinders 122 and 124.

The thickness testing means 22, as seen in FIGS. 7 and 16 also includes a gauge sensing member 142, which overlies the sample 42 and is part of a commercial thickness gauge 144 having an indicator potentiometer 146. The indicator potentiometer 146 is connected to the analog circuit, which in turn is connected to load cell 266 and computer 30, as shown in FIG. 24.

The air cylinders 122 and 124 have compression springs, which tend to urge the anvil 110 down to a return position and to permit passage of the cradles 34 until testing is to take place. The testing is initiated in the proper timed sequence by the actuating of the air valves 140 shown in FIG. 10. The thickness is displayed on the dial indicator portion of the potentiometer 146.

After the thickness is tested, the conveyor means 18 advances the specimen into association with the photocell scanning means 24. The photocell scanning apparatus comprises two photocell scanners 148 and 150, which are mounted on respective carriages 148a and 150a, as shown, for example, in FIGS. 7, 4 and 6. Each scanner set 148 and 150 includes a light producing device or lamp 152 and a photocell 154, which are arranged so that the lamp shines a brightly lighted line on the sample 42 and the photocell 154 is simultaneously focused on the same spot on the sample.

A scanner carriage 150a, carrying scanner set 150, is secured to an endless control chain 156, as indicated in FIG. 4, which is displaced backwardly and forwardly in a straight line during carriage movement. Guide rollers 158 of the carriage are movable along a guide track 160. The carriage 148a carries scanner set 148, and it includes sprocket elements 162 and 164 which engage the chain 156. The sprocket chain 156 is guided around an idler sprocket 165 and a sprocket 166 at the opposite end, and it includes a spring section 168 to take up any slack.

Figure 6:
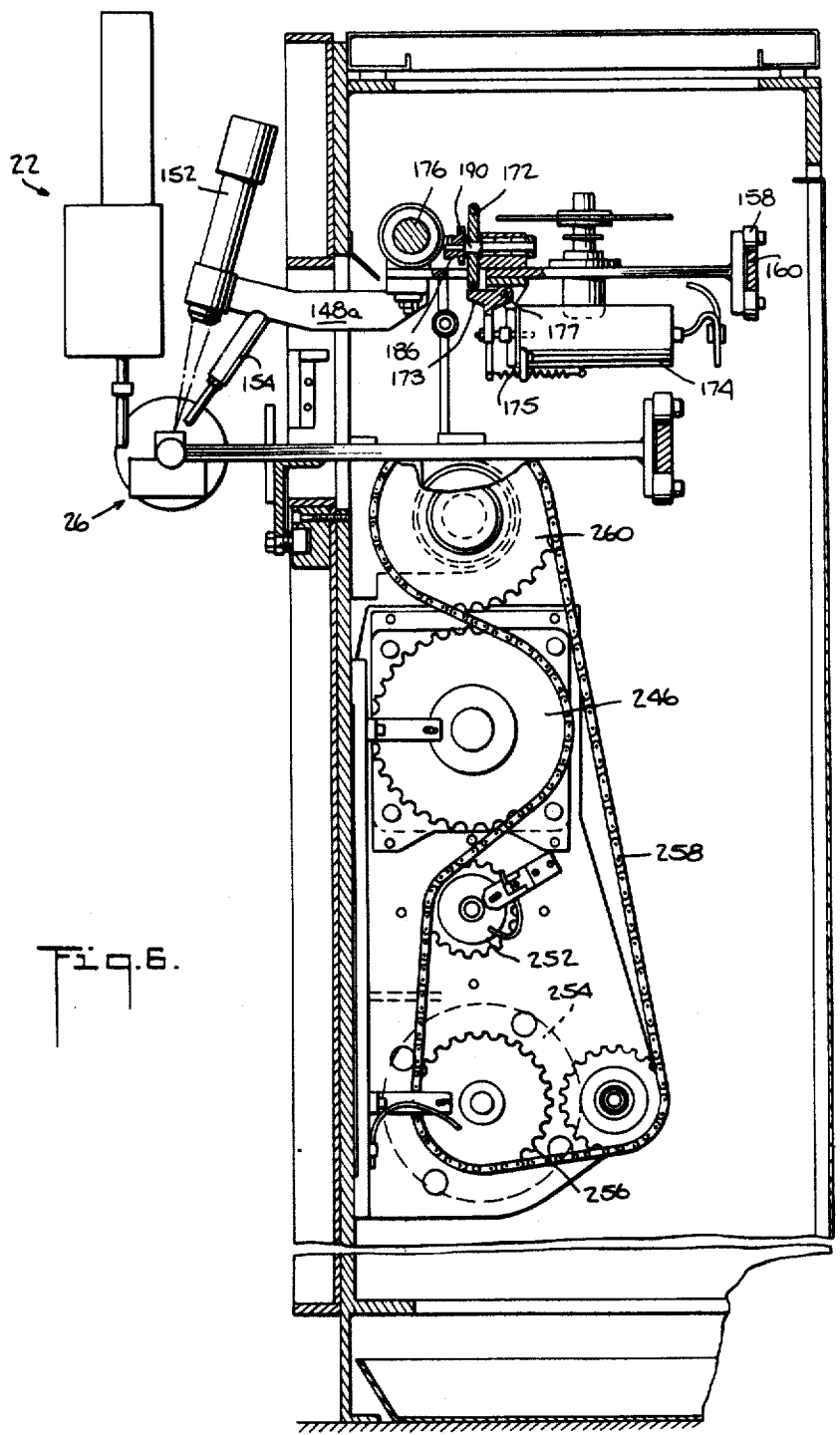
FIG. 6 is a section taken along the line 6—6 of FIG. 4.

Each carriage 148a and 150a also carries a frictional drive wheel 170 and 172, respectively, which, as shown in FIG. 6, engages with a lever member 173 when the associated photocell carriage 148a and 150a is to be advanced during the actual tensile testing of the specimen. A solenoid 174 is positioned to pivot the lever about its pivot 177 into an engaged position when the testing is to take place. When the testing is to be stopped, or during the time of the testing procedure that the scanners are not to be moved, the lever member 173 is permitted to drop back into its non-actuated position by the action of a spring 175. Each carriage 148 and 150 includes a hub portion 148b and 150b, which is slidable on a rod member 176 during the time in which it is moving.

A two-level voltage signal from the photocell of each scanner is fed to an amplifer, which has a two-position switching output. The contacts of the output switch C1 and NC1 energize the solenoid 174. The switching is two-position. When the photocell 154 sees a dark portion of the bench mark on the sample, the contacts C1 and NC1 close to energize the clutch solenoid 174. Two identical systems are used for the photocell scanners 148 and 150.

The photocell drive comprises a driving motor 178 which drives a sprocket 180 and a sprocket chain 182. The chain 182 is guided over a guide sprocket 184 and sprockets 186 and 188 carried on the respective carriages 148a and 150a. Rotational movement imparted into the shaft 190 of each associated carriage sprocket 186 and 188, as shown in FIG. 6, is transmitted into a shifting movement of the associated carriages 148a and 150a only when the lever 173 is set by the solenoid 174, and there is frictional engagement by the frictional drive wheel 172 with the lever 173.

Figure 18:
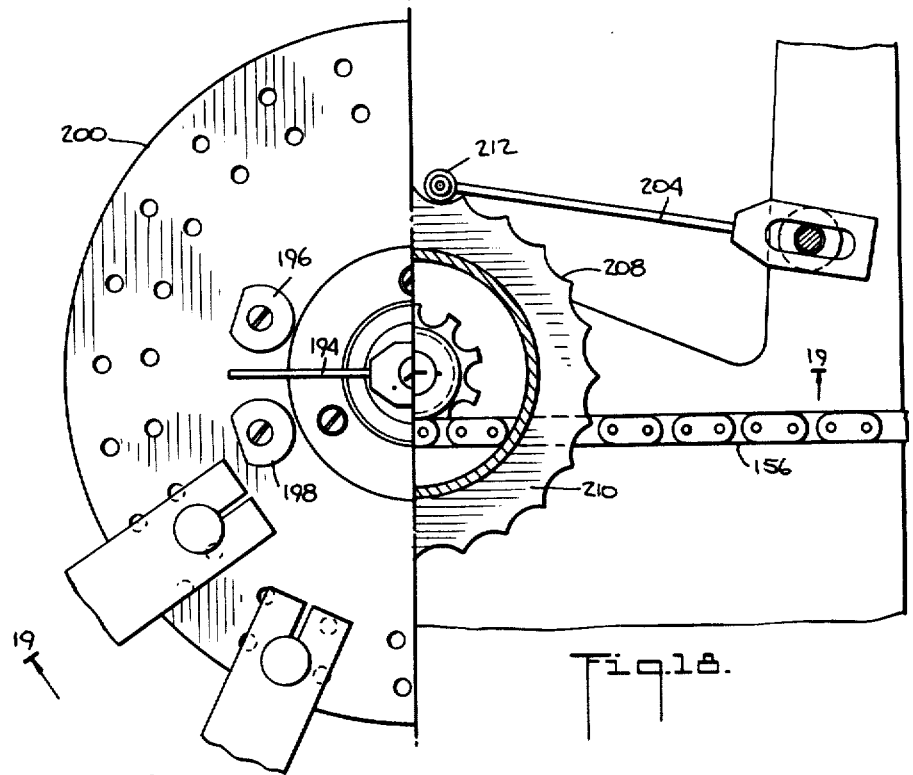
FIG. 18 is a partial top plan view of the photoscanner positioning information device.
Figure 19:
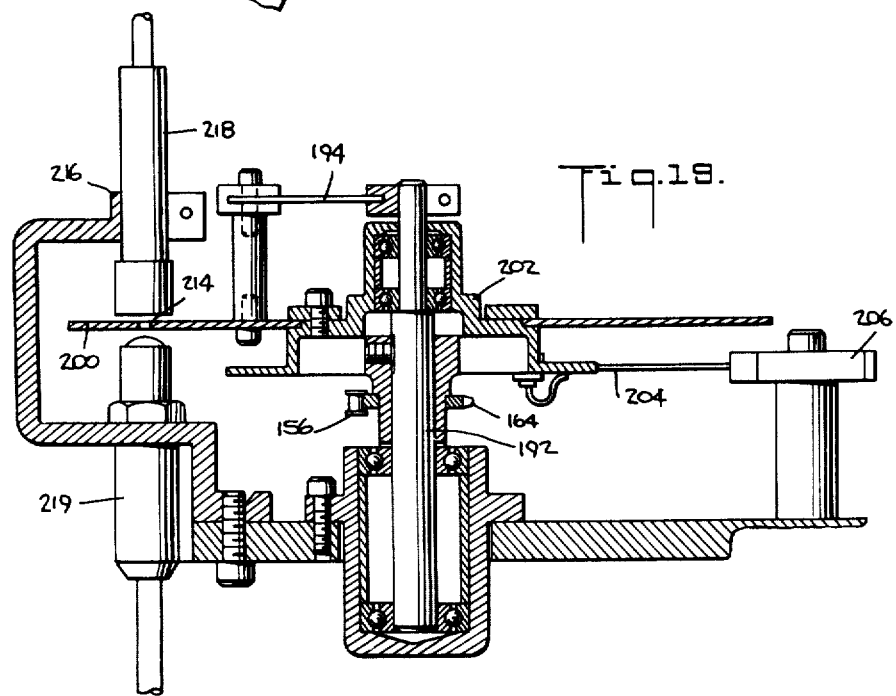
FIG. 19 is a section taken along the line 19—19 of FIG. 18.

As shown in FIGS. 18 and 19, the sprocket 164 which is connected with the chain 156 drives a shaft 192, which carries a radially extending finger 194, which is located between upright drive detents 196 and 198 to provide a lost motion drive for a position sensing disc or encoder disc 200. The disc 200 is carried on a hub portion 202, which rotates with the disc around the shaft 192. The motion of rotation is hindered by a biasing finger 204 which extends outwardly from a fixed holder 206 and engages within the recesses 208 of a detent disc 210. The finger 204 carries a roller 212, which fits into the detent recesses. The disc 200 carries a plurality of openings 214 which are moved by the action of the finger 194 via the lost motion detents 196 or 198 progressively past photocell scanning means 216 which includes a light 218 and a photocell 219. The detent arm 204 limits any over travel and provides the precise indexing of the openings 214 in proportion to the movement of the scanner carriages 148a and 150a and this information is fed photo optically to the computer 30.

During the time in which the photocell scanning means 24 is moving in operative association with the bench marks of the specimen, the specimen is subjected to tensile testing which is effected by the engagement of the specimen 42 with the tensile gripping means 26. The tensile gripping means 26 includes the movable jaw member 46 and the fixed jaw member 48, each of which includes a base portion 216, as shown in FIGS. 20 to 23, having an upstanding pivot part 216a and with a lever part 220, which is pivotal on the pivot part 216a and includes a jaw portion 220a, which engages with a jaw portion 216a of the fixed part when the sample 42 is clamped. The clamping of each jaw is effected automatically by directing gas or air pressure through a connecting line 222 to urge a piston 224 upwardly. The piston 224 includes an extending portion 226 which is provided with a through bore 228 into which an end 220b of the lever extends. Upward movement of the piston 224 causes the pivotal upward movement of the end portion 220b of the lever and the engagement of the jaws. The fixed or lower jaw part 216 includes a pressure conduit 230 for applying a gas or air blast in the vicinity of the clamping jaws, which acts on a recess within a serrated base of the jaws. The upper part 220 also includes a pressure conduit 232 for the same purpose. The fixed part 216 carries a conduit 234 with gas or air under pressure to provide an air blast for releasing the sample from the gripper. Air is also supplied through a conduit 222 for gripping the sample.

The fixed jaw, generally designated 48, is attached to the machine frame and the movable jaw is secured to a puller head 240, as shown in FIG. 4. The conduits 230, 232 and 234 lead to an external timed air pressure source. The normal position of each of the gripping assemblies 46 and 48 is with the top jaw open; air pressure on the bottom side of the piston 224 is vented to the atmosphere and the pressure is applied on the top side through conduit 236. When the sample is to be gripped, the air in the conduit 236 is released and the conduit 222 is pressurized. When the sample is released, the air in the conduit 222 is released and the conduit 236 is pressurized. The sample is released from the jaw faces by delivering a timed pulse of high pressure air into the conduits 230 and 232 from an external air supply. Thereafter, a horizontal air blast is directed through conduit 234 for expelling the sample from the jaws. As shown in respect to FIGS. 5 and 6, the tensile gripping means 26 includes: separately operable first drive motor 242 which drives through a clutch 244 to a sprocket 246 for a first drive speed, a second drive motor 248 which drives through a clutch 250 and a sprocket 252 for a second speed, and a third motor 254 which drives a sprocket 256 for the rapid reverse movement. Sprockets 246, 252 and 256 are all connected to drive a chain 258 to separately rotate a driving sprocket 260 for driving a puller head assembly, generally designated 262, for the movable jaw.

The puller head assembly 262 (FIG. 5) comprises a nut which is engaged on a screw 264 and which moves backwardly and forwardly upon rotation of the screw which is effected by the sprocket 260 affixed to one end thereof. The puller assembly 262 carries an arm 266 with a stop 268, which is located to engage a sleeve 150b, which is slidable on a rod 176 and carries the scanner carriage 150a. By means of this engagement, the stop 268 returns the scanner carriage 150a to a starting position when the puller assembly 262 is returned from the maximum end run position shown in solid lines in FIG. 5 to the dotted lines starting position under the driving action of the reversing motor 254 which provides a rapid return. The sleeve 150b of the photoscanner carriage 150a will abut against the stop 268 at the zero position of the puller assembly 262. As the pull proceeds and the bench mark stripes move apart, the scanner means 24 associated with the carriage 150a follows the left stripe while the scanner means associated with the carriage 148a follows the right stripe of the bench mark. As the two scanner heads move apart, the chain 156 (FIG. 4) rotates the sprocket 164 thereby passing the holes 214 of the encoded disc 200 (See FIGS. 18 and 19) successively in front of the photocell 220. Each hole equals 1/10 of an inch and each hole passes a photo optical pulse to the appropriate register of the unit 30 shown in FIGS. 1 and 2.

In the schematic drawing shown in FIG. 24, the potentiometer 146 is shown connected electrically to a 115v AC source and to a load cell 266 having a calibrating attachment 268. The connection of the load cell and the potentiometer 146 to the computer 30 is also shown.

Figure 25:
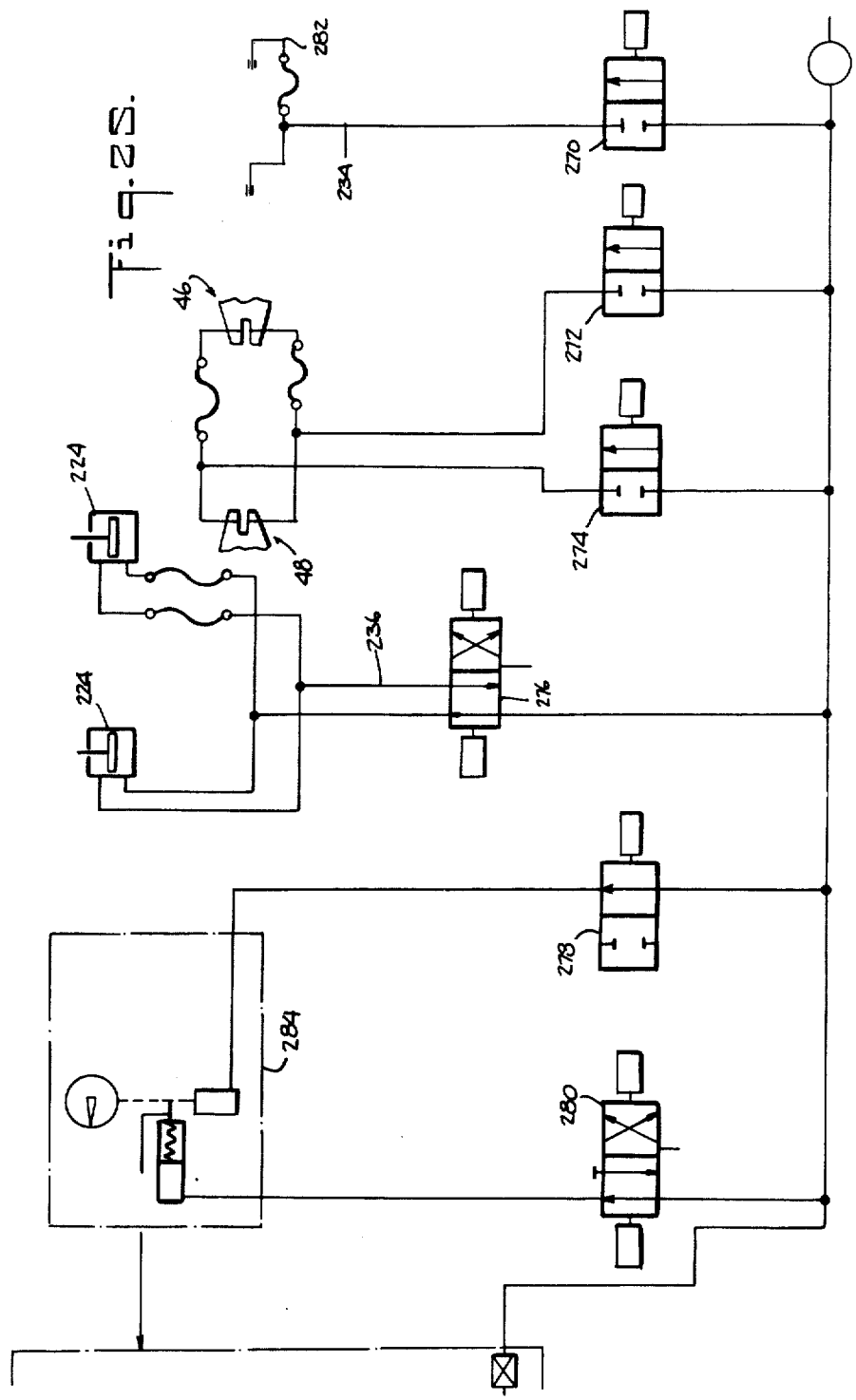
FIG. 25 is a schematic diagram of the pneumatic controls.

The pneumatic circuit for the gripping jaws for the movable jaw 46 and the fixed jaw 48 is shown in FIG. 25. The system indicated shows the various solenoid valves 270, 272, 274, 276, 278 and 280 which are employed for the control of the specimen-expelling air blast lines 234/282; for the control of the specimen-releasing air blast lines 230/232 in the lower and upper jaw members 216/220 of the movable and fixed jaws 46 and 48; for the control of the movable jaw members 220 by the operating pistons 224; and for the connections of the various mechanisms to the air pressure storage means 284.

Figure 26C:
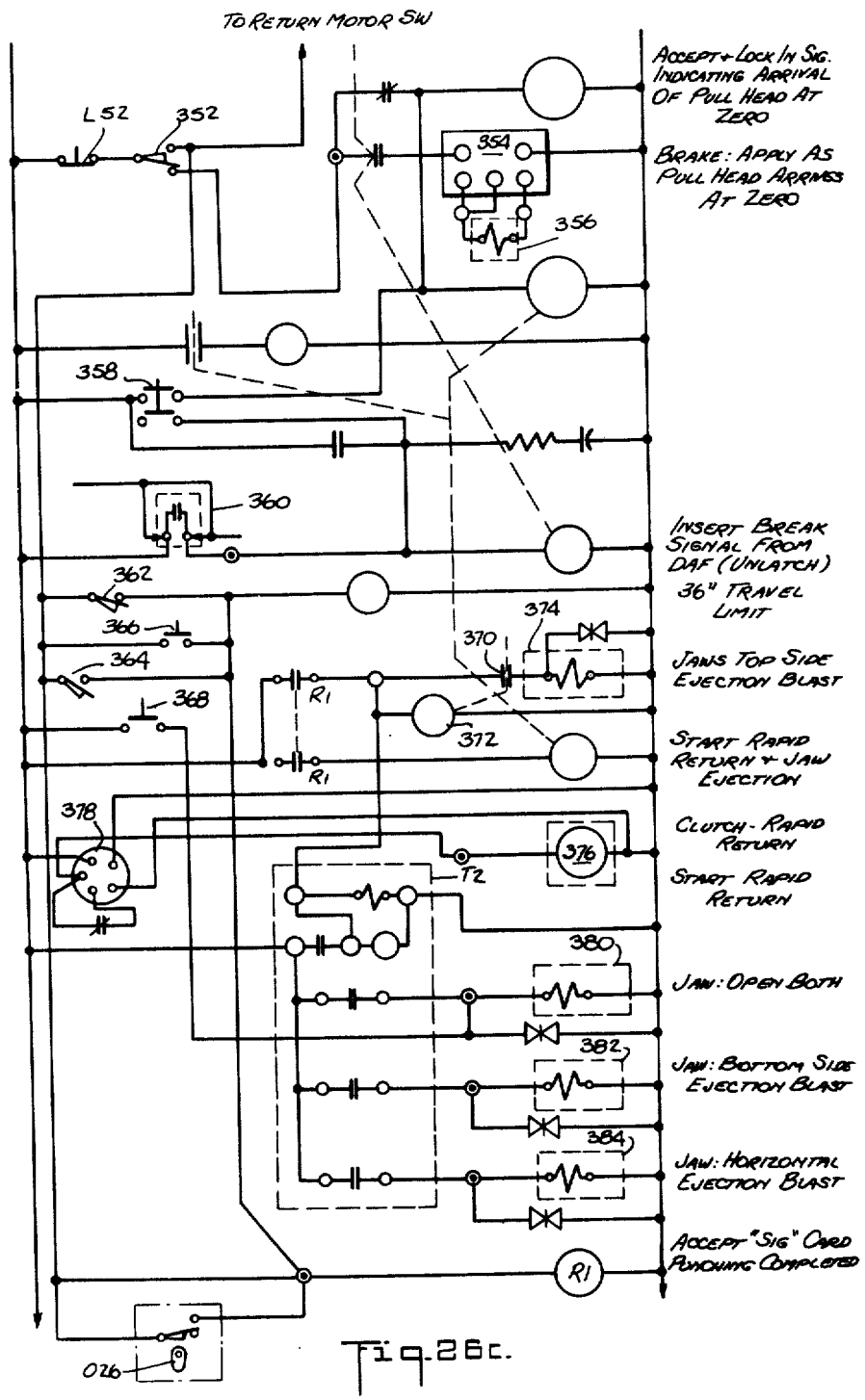
FIGS. 26A, B and C are schematic electrical diagrams for the operating circuits.

FIGS. 26A, 26B and 26C show the electrical diagrams for the various operating parts of the overall device.

As shown in FIG. 9, the input shaft 62 of the intermittent driving mechanism carries a cam 286 which engages and trips a switch 288 at conveyor zero position.

The operation of the device is as follows:

The samples 42 are loaded into the cradles 34 and the bench mark stripers are loadoed with the respective white and black inks. The computer or DAF unit 30 is turned on and an operator presses the manual start button 300, as shown in FIG. 26A. The timer T1 starts and carries out the following:

The lock for the data in the indicator of the thickness gauge 144 is released.

The gauge probe 142 is moved downwardly, and the anvil 110 is moved upwardly to measure the thickness. The lock on the indicator 146 is again applied. The motor 50 is started, and the input shaft 62 causes the cam 136 to leave the roller 138 of the air valve 140. The air is exhausted from the valve 15. The anvil 110 is moved downwardly through the opening of the chain to clear the movement of the chain.

The conveyor then moves forward one cradle length, and the cam 136 again actuates the valve 140 thereby changing from a vented condition of the valve to a pressurized condition to cause the pressure in the cylinders 124 and 126 of the anvil 110 to move the anvil upwardly pressing the whiffle tree 116 against the end stop and thereby obtaining a positive and precisely repeatable bottom anvil position. The gauge indicator 146 then displays the sample thickness and the potentiometer is locked at a resistance setting corresponding to the sample thickness. The analog circuit and the load cell are ready to translate the tension value of the sample into a millivolt signal which is proportional to the actual thickness of the sample.

The conveyors then advance by one cradle length and both of the clamping jaws are closed on a sample and the movable jaw 46 is moved to begin the tensile pull on the sample.

The two photoscanners are started by energizing the clutching coil or solenoid 174 shown in FIG. 6. At the start of the pull, both photoscanners on the carriages 148a and 150a start in a position where the lamps in the photocells are both focused on the black areas of the black and white bench marked stripes. This is a "seeking" mode and the contacts 1 and 4 of the relay switch SW2-b close. The solenoid 174 is therefore energized.

The energization of the solenoid 174 causes the rocking of lever 173 which presses against the periphery of the rubber surfaced roller 172 so that the sprocket which is affixed to the roller 172 is locked against rotation so that the carriage 150a for the photocell scanners is moved along with the chain 182. A normal, or not-following condition, of the apparatus is one in which the chain moves continuously and idles loosely over the sprockets 186 and 188 so that all of the sprockets rotate freely in their bearings. When the sprockets 186 and 188 are locked together against rotation, the chain is effectively gripped and the carriage moves along at the speed of the chain 182. The speed of the chain 182 is higher than the movement rate of the bench marks, and the photospot overtakes and shines on the bench mark demarcation line between the black and white portions. At 50 percent white impingement, the photocell 220 trips and opens the contact 1 to 4 and breaks the power supply to the solenoid 174 to cause a release of the lever 172 so that the sprocket 186 and the wheel 170 are unlocked again. This allows the carriage to stop.

A short time later, the bench mark moves far enough apart to trip the photoscanner to "on" and to reenergize the solenoid 174. Repetition in small increments at about 5 pulses a second is carried out.

As the testing proceeds, a millivolt signal equal to the sample stress value is delivered to the computer 30. The strain signals stream at one pulse per 10 percent of strain is delivered to the computer 30 by the photocell 220. The computer 30 accepts, organizes and processes both data streams. The output of the computer 30 drives a card punch 28 to produce an 80 column card punched as follows:

a. 100–500 percent modulus
b. ultimate stress
c. ultimate strain $a$, $b$ and $c$ is the output of the system.

A switch 026 as shown in FIG. 26C in the card punch 28 immediately following the last digit of the data energizes R1 to start the timer T2 and this results in the following:

A start of the rapid return of the puller assembly 262, as shown in FIG. 5, an opening of the gripping jaws 46 and 48. The starting of the top ejection air blasts for the gripping jaws and the timing of the bottom ejection air blasts and the time for the horizontal ejection air blast. The pulling head 262 is returned to a zero position or start position and is braked at the zero position by a magnetic brake through a switch L52, as shown in FIG. 26C.

In the manual mode of machine cycle operation, the machine stops as the pull head 262 returns to zero. In the automatic mode, the machine proceeds to process the next sample immediately on arrival at zero.

Referring now to FIG. 26A, conveyor motor 50 and rapid return motor 54 are connected by magnetic starters 306 and 308 respectively to fuses 304 and a 3-pole manual switch 302 which supplies them with 440v of power. The computer 30 is supplied with 120v of power by means of the switch 300 and is also equipped with an emergency stop switch 310. Power is supplied through the computer 30 via fuses 312 and 314 to a circuit containing photocell drive motor 178, bench mark striper motor 78, and pull head motors 244 and 250.

Timer T1 is supplied with power through the computer 30 via fuses 312 and 316 and switch 320. Timer T1 contains a selection circuit 318, a gauge interlock reset circuit, and solenoids 322, 324 and 326 for the releasing of the gauge head spindle lock, control of the vertical motion of the gauge probe and the applying of the gauge head spindle lock, respectively. The circuit is also provided with push button switch 328 which is used to calibrate the gauge.

Referring to FIG. 26B, switch 330 is used to close the jaws, and this can be done either manually or automatically. Switching device 332 is connected to power supply 334, which provides 28v DC for photo extensometer amplifiers 336, which contain the switches C1 and NC1 used to energize the solenoid 174. Switch 338 is used for calibrating, and microswitch 339 starts the DAF unit 30. Switch 340 is a selector switch for the two-puller head motors 242 and 248 and is connected to clutch coils 244 and 250. Switch 342 is for the rapid return motor 254. Inductance coils 344 provide the power supply for the light source. Photoscanner lamps 347 are fed power via transformer 346. Microswitch 348 is used to stop the pull head at the zero stroke. Power supply 350 provides power for the analog circuit.

Referring to FIG. 26C, switch L52 is a push button switch for the brake release, and switch 352 stops the pull head 240 when it is at a zero stroke position. A 28v DC power supply 354 is connected to an electrically operated brake 356, with switch 358 acting as a resetting switch. Contacts 360 are located at the rear of the DAF unit 30. Switches 362 and 364 are 36 inch travel limit switches for the pull head and scanner arm, respectively, switch 366 is a bush button dump control, and switch 368 is a push button switch to open the jaws 46 and 48. Time delay relays 370 and 372 are connected to solenoid 374, which controls the top side ejection blast of the jaws 46 and 48. Power supply 378 provides 90v DC to clutch 376 for the rapid return motor 254. Solenoids 380, 382 and 384 control the opening of the jaws 46 and 48, the bottom side ejection blast and the horizontal ejection blast, respectively.

While a specific embodiment of the invention has been shown and described in detail to illustrate the application of the principles of the invention, it will be understood that the invention may be embodied otherwise without departing from such principles.

What is claimed is:

1. A cradle device for holding a sample having widened end portions and an intermediate neck portion, of which said end portions are to be engaged by grippers of a tensile testing apparatus, comprising a cradle member adapted to be incorporated as an element of a conveyor chain for movement therewith and having a flat top sample receiving face extending transversely to the intended direction of movement with two spaced-apart laterally oriented shoulders at each end for receiving the respective widened end portion of the sample therebetween, and the two shoulders at one end of said cradle member forming a recess of a size and shape to receive one widened end portion of a sample and flaring outwardly from an inwardmost narrowest opening for accommodating said neck portion of a sample at the juncture thereof with said one widened end portion to an outwardmost widest opening, the length of said cradle member being such that when a sample is received thereon said widened end portions of the sample extend beyond the ends of said cradle member for engagement by the grippers.

2. A cradle device for holding a sample for tensile testing, according to claim 3, wherein said shoulders at said one end of said cradle member are raised projections on said top sample receiving face and have inner curved edges engageable with the lateral edges of the sample from the region of transition between said intermediate neck portion and said one widened end portion to the proximate end of said cradle member.

* * * * *